US011233945B2

(12) United States Patent
Shibuya et al.

(10) Patent No.: US 11,233,945 B2
(45) Date of Patent: Jan. 25, 2022

(54) IMAGING APPARATUS

(71) Applicant: Hitachi Kokusai Electric Inc., Tokyo (JP)

(72) Inventors: Takuhiro Shibuya, Kodaira (JP); Shiro Ikeda, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/273,350

(22) PCT Filed: Aug. 20, 2019

(86) PCT No.: PCT/JP2019/032369
§ 371 (c)(1),
(2) Date: Mar. 4, 2021

(87) PCT Pub. No.: WO2020/050001
PCT Pub. Date: Mar. 12, 2020

(65) Prior Publication Data
US 2021/0321045 A1 Oct. 14, 2021

(30) Foreign Application Priority Data
Sep. 4, 2018 (JP) .............................. JP2018-165211

(51) Int. Cl.
*H04N 5/232* (2006.01)
*H04N 5/33* (2006.01)
(Continued)

(52) U.S. Cl.
CPC ....... *H04N 5/232939* (2018.08); *H04N 5/332* (2013.01)

(58) Field of Classification Search
CPC .... H04N 5/23239; H04N 5/332; H04N 5/142; H04N 5/23296; H04N 5/2628;
(Continued)

(56) References Cited

U.S. PATENT DOCUMENTS 10,136,059 B2 * 11/2018 Kinoshita .......... H04N 5/23241
10,154,186 B2 * 12/2018 Kang ................... H04N 5/2258
2020/0221020 A1 * 7/2020 Manzari ............. H04N 5/23216

FOREIGN PATENT DOCUMENTS

JP       11-341441 A      12/1999
JP     2010-245846 A      10/2010
(Continued)

OTHER PUBLICATIONS

International Search Report of PCT/JP2019/032369 dated Oct. 21, 2019.

*Primary Examiner* — Marly S Camargo
(74) *Attorney, Agent, or Firm* — Mattingly & Malur, PC

(57) ABSTRACT

An object of the present invention is to provide an imaging apparatus that can comfortably be focused while an influence on a wide angle image is minimized. The imaging apparatus includes: a display unit for displaying an image being photographed; an enlarged image display function for displaying an image obtained by enlarging a part of an area being photographed in the display unit; an edge component detection function for detecting an edge component amount of an enlarged image area; and a focal point position detection function for detecting movement of a focal point operated by a photographer. Duration time of the enlarged image display displayed by the enlarged image display function is changed in conjunction with the edge component detected by the edge component detection function and the movement of the focal point detected by the focal point position detection function.

3 Claims, 14 Drawing Sheets

(51) Int. Cl.
  *H04N 5/14*     (2006.01)
  *H04N 5/262*    (2006.01)
  *H04N 5/345*    (2011.01)
  *H04N 3/16*     (2006.01)
  *H04N 1/14*     (2006.01)
  *H04N 1/40*     (2006.01)

(58) Field of Classification Search
  CPC ........... H04N 5/232935; H04N 5/3454; H04N 3/1562; H04N 1/142; H04N 1/409; H04N 1/4092; H04N 1/00161; G02B 7/36
  USPC ..... 348/207.1, 207.99, 208.12, 208.6, 211.9, 348/240.99, 240.1, 240.2, 240.3, 333.01, 348/333.02, 333.09, 222.11, 326, 347, 348/341, 252; 382/199, 255, 266
  See application file for complete search history.

(56) References Cited

FOREIGN PATENT DOCUMENTS

| | | | | |
|---|---|---|---|---|
| JP | 2014-086938 | A | 5/2014 | |
| JP | 2014-086938 | * | 12/2014 | ............. H04N 5/225 |

\* cited by examiner

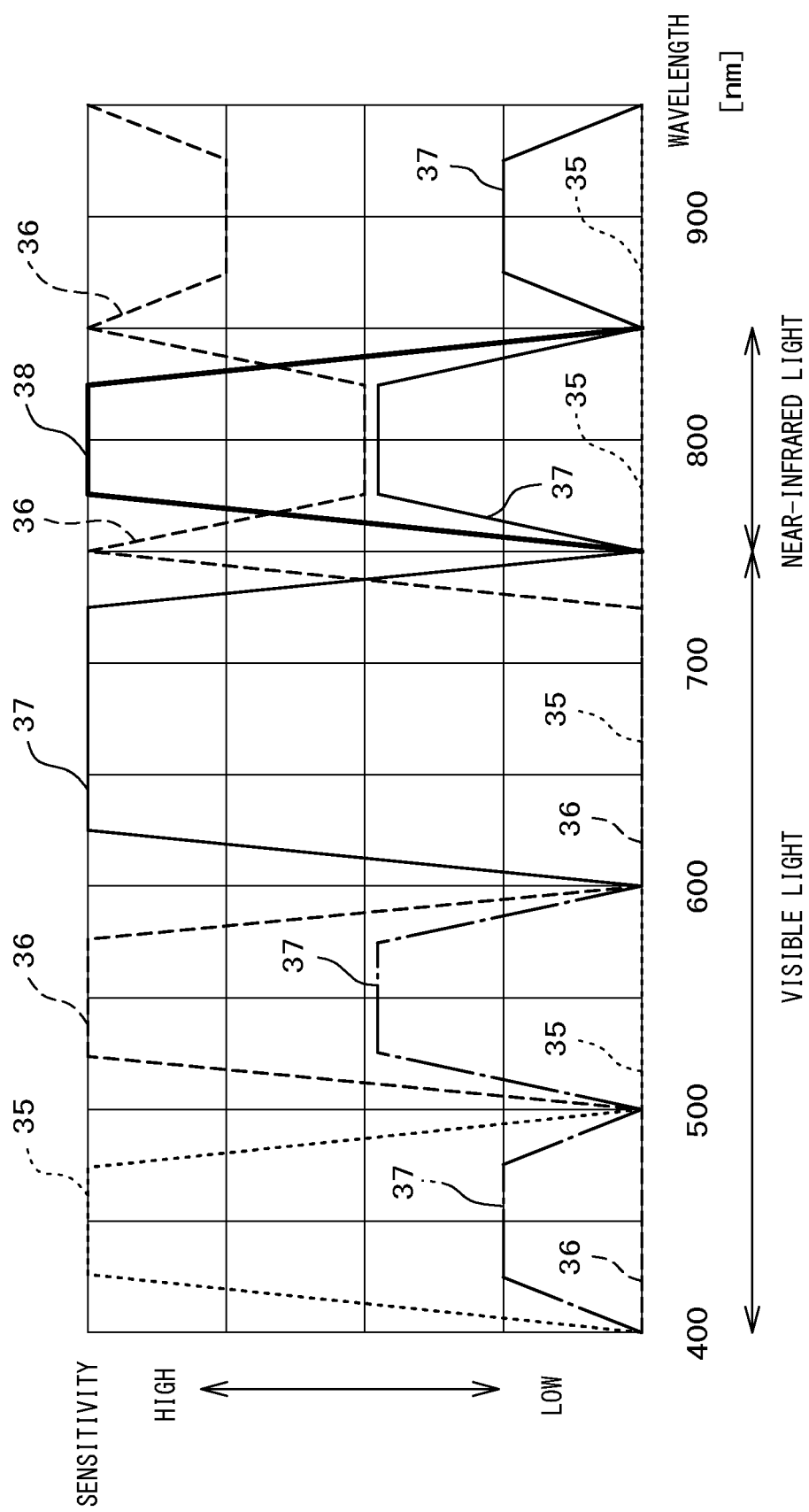

IMAGING APPARATUS

TECHNICAL FIELD

The present invention relates to an imaging apparatus such as a digital video camera, and in particular relates to an imaging apparatus including an auxiliary display function suitable for checking the focused state of the imaging apparatus itself.

BACKGROUND ART

In recent years, photographers have been required to more exactly focus imaging apparatuses on photographic subjects as the resolutions of imaging apparatuses have become higher (for example, HD, 4K, 8K). However, there is a problem in that, if the screen size of the viewfinder of an imaging apparatus used for checking an image that a photographer himself/herself takes is too small, or if it is difficult to check whether or not the imaging apparatus is focused on a photographic subject owing to the low resolution of the screen of the imaging apparatus, it becomes difficult to exactly focus the imaging apparatus on the photographic subject.

Therefore, various auxiliary display functions that make a photographer more easily grasp the focusing degree (focused state) have been devised. For example, there are some auxiliary display functions such as highlighting (peaking) of focused edge portions of a photographed image, a partial enlargement display for checking the focused state of the photographed image, and the like. PLT 1 discloses an imaging apparatus having not only a function of enlarging the display of a partial area of a photographic subject but also a function of displaying the wide angle image of the entirety of a screen being photographed, or a function of graphically representing the edge component of the enlarged area on the same screen when a manual focusing operation is executed.

CITATION LIST

Patent Literature

PTL 1: Japanese Patent Application Laid-Open No. Hei 11-341441

SUMMARY OF INVENTION

Technical Problem

A partial enlargement display function is a very effective function for checking the focused state using a viewfinder of an imaging apparatus with a small screen size. On the other hand, the wide angle image for checking the composition and photographed condition of the entirety of the screen is also important, so a time period during which the enlarged image overlaps the wide angle image should be as short as possible. In other words, it is preferable that the enlarged image display should be turned off immediately after a photographer finishes focusing the imaging apparatus and the movement of the focal point is stopped.

On the other hand, in a focusing operation, it is difficult for an unskilled photographer to accurately move the focal point of an imaging apparatus to the optimal focused focal point by only once executing the operation of moving the focal point in one direction (for example, the operation of moving the focal point from the nearest side to the infinity side). In most cases, after the focal point of the imaging apparatus passes over the focused focal point, the focal point is moved in the opposite direction. Furthermore, an additional operation that the focal point is moved back and forth with the focused focal point as a center is executed several times to finely adjust the focal point. When the focal point is about to be moved in the opposite direction, the movement of the focal point is stopped for a moment, and therefore if an enlarged image display is turned off immediately after the stoppage of the movement of the focal point as described above, the on/off operation of the enlarged image display are repeated many times during the fine adjustment of the focal point. Such an on/off movement of the enlarged image display should be avoided because it makes it difficult to check the focused state of the imaging apparatus and places a strain on the eyes of a photographer who pays close attention to the screen of the viewfinder. In other words, it is preferable that, even if the movement of the focal point is stopped during a time of a focusing operation executed by the photographer, the enlarged image display is kept in an on-state for a predefined time.

Although a time period between the stoppage of the movement of a focal point and the turnoff of the relevant enlarged image display is not clearly specified in PLT 1, it can be presumed that the time period can be set to an arbitrary time period by a photographer at his/her disposal. However, no matter how the time period is set, it is impossible to satisfy the abovementioned two ideal movements.

A problem of the present invention is how to provide an imaging apparatus that can comfortably be focused while an influence on a wide angle image is minimized by satisfying the abovementioned two ideal movements.

Problems other than the above and new features will be explicitly shown by the descriptions of this specification and the accompanying drawings.

Solution to Problem

The outline of a typical imaging apparatus according to the present disclosure can briefly be described as follows.

To put it concretely, an imaging apparatus includes: a display unit for displaying an image being photographed; an enlarged image display function for displaying an image obtained by enlarging a part of an area being photographed in the display unit; an edge component detection function for detecting an edge component amount of an enlarged image area; and a focal point position detection function for detecting movement of a focal point operated by a photographer. Duration time of the enlarged image display displayed by the enlarged image display function is changed in conjunction with the edge component detected by the edge component detection function and the movement of the focal point detected by the focal point position detection function.

Advantageous Effects of Invention

According to the above-described imaging apparatus, a comfortable focusing operation can be achieved while an influence on a wide angle image is minimized.

BRIEF DESCRIPTION OF DRAWINGS

FIG. 14 is a diagram used for explaining a prism that resolves a visible light and a near-infrared light.

DESCRIPTION OF EMBODIMENTS

In the following, some examples and modifications are explained with reference to the accompanying drawings. In the following descriptions, however, the same components are given the same reference signs, and redundant explanations thereabout will be omitted in some cases. In addition, there are some cases where, in the accompanying drawings, the several portions of the examples and modifications are schematically depicted differently from what they really are for clarifying the following descriptions, but these depictions are only examples, so that the interpretation of the present invention is not limited by these depictions.

Example 1

Figure 1:
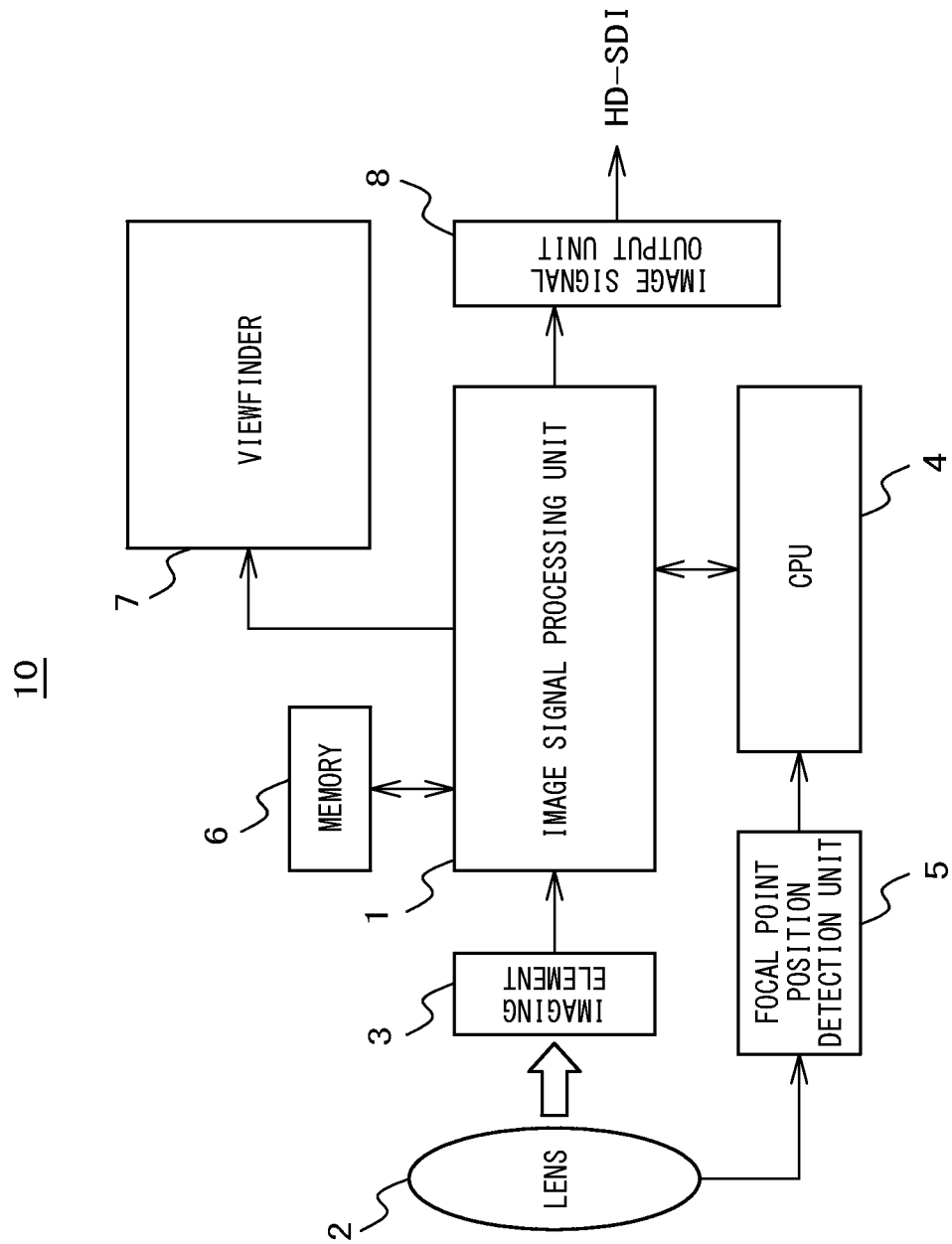
FIG. 1 is a block diagram showing a configuration example of an imaging apparatus according to Example 1.

FIG. 1 is a block diagram showing a configuration example of an imaging apparatus according to Example 1.

FIG. 1 shows that an imaging apparatus 10 includes a lens 2, an imaging element 3, an image signal processing unit 1, a memory 6, a focal point position detection unit 5, a CPU (central processing unit) 4, an image signal output unit 8, and a viewfinder 7 that is a display unit.

Incident lights from a photographic subject focus into an image through the lens 2, and the image is photoelectrically converted into an electric signal by the imaging element 3. The image signal processing unit 1 executes various kinds of signal processing on the image signal and displays the image on the viewfinder 7, and at the same time an HD-SDI (high definition serial digital interface) signal is outputted from the image signal output unit 8. The CPU 4 controls the respective units of the imaging apparatus 10, and detects the movement of the focal point using a signal from the focal point position detection unit (focal point position detection function) 5.

Here, it is not always indispensable that the image signal outputted from the image signal output unit 8 should be an HD-SDI signal as shown above as an example, but it does not matter that the image signal is a compressed signal, an encrypted signal, or the like.

Figure 2:
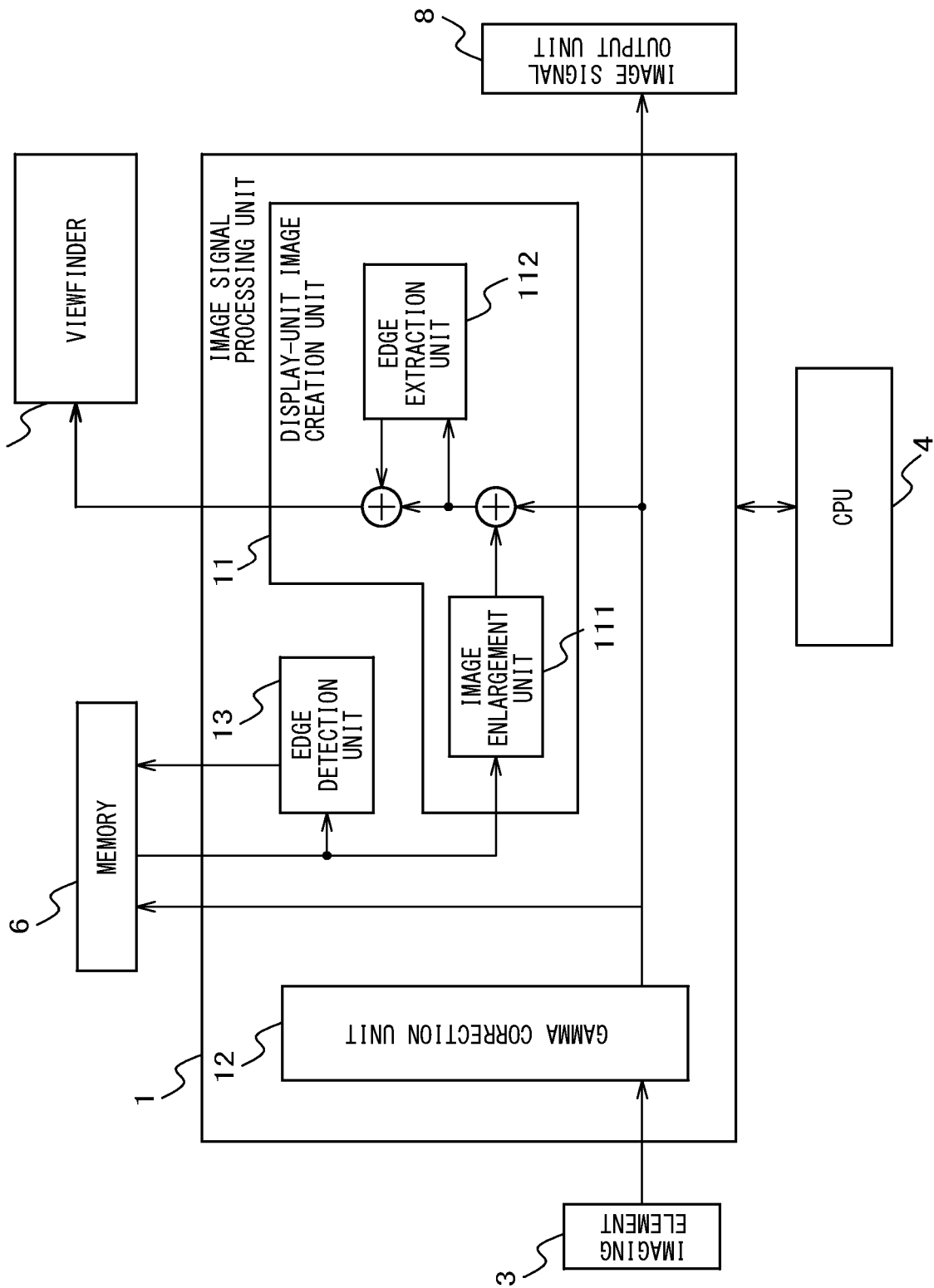
FIG. 2 is the block diagram of an image signal processing unit according to Example 1.
Figure 3:
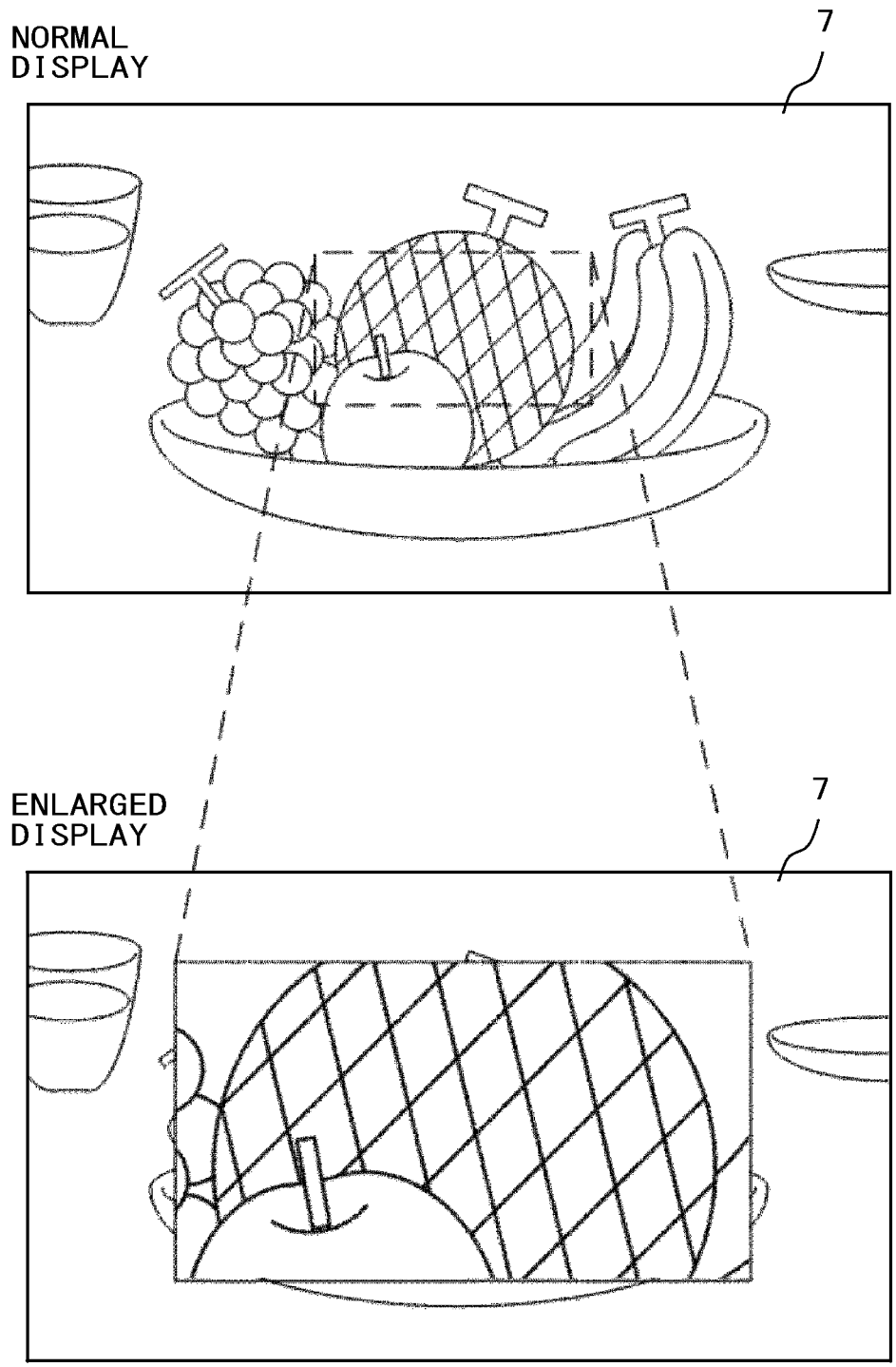
FIG. 3 is a diagram showing an enlarged display using a viewfinder.

FIG. 2 is the block diagram of the image signal processing unit according to Example 1. FIG. 3 is a diagram showing an enlarged display shown in the viewfinder.

As shown in FIG. 2, the image signal processing unit 1 includes a gamma correction unit 12, a display-unit image creation unit 11, an edge extraction unit 112, an image enlargement unit (enlarged image display function) 111, and an edge detection unit (edge component detection function) 13. The respective units of the image signal processing unit 1 are controlled by the CPU 4.

The image signal processing unit 1 executes various kinds of signal processing such as a gain correction, a gamma correction, a knee correction, an outline correction, a color correction, and the like on the image signal outputted from the imaging element 3 in the gamma correction unit 12, and outputs the processed image signal to the image signal output unit 8. The respective correction coefficients and the on/off operations of the respective correction functions are controlled by the CPU 4.

Not only the image outputted to the image signal output unit 8 but also an image created in the display-unit image creation unit 11 for making it easy for a photographer to check the focused state and the like of an image is displayed on the viewfinder 7. First, the image signal is once stored in the memory 6, and an area to be displayed in an enlarged manner is cut out and read out. The edge component amount of an enlarged image area is detected by the edge detection unit 13 from the cut-out and read-out image, and at the same time enlargement processing such as resolution conversion is executed on the cut-out and read-out image by the image enlargement unit 111. Subsequently, the cut-out and read-out image on which the enlargement processing is used for synthesizing an image signal in the display-unit image creation unit 11. The enlargement image area, the enlargement ratio, and the on/off operation of the enlargement function are controlled by the CPU 4. Furthermore, in the display-unit image creation unit 11, the edge component is extracted from the image signal by the edge extraction unit 112, and an image the outline of which is highlighted more clearly is created by synthesizing the image signal using the edge component. The coefficient of the outline highlight and the on/off operation of the function of the outline highlight is controlled by the CPU 4. The image on which these kinds of processing are executed is displayed on the viewfinder 7 as a display-unit image (Refer to FIG. 3).

Figure 4:
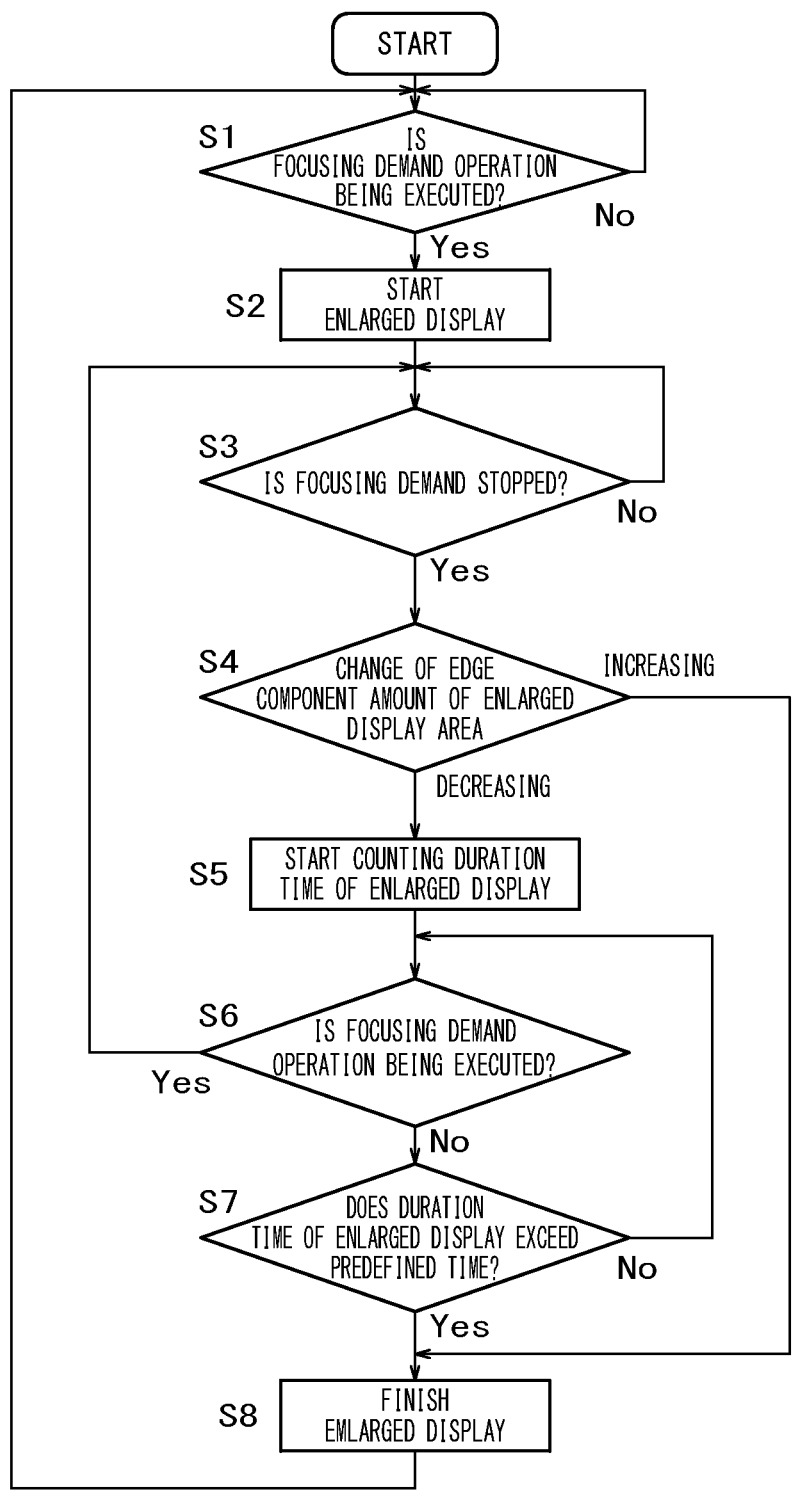
FIG. 4 is a diagram showing the behavior of the imaging apparatus according to Example 1.

Next, the behavior of the imaging apparatus according to Example 1 will be explained with reference to FIG. 4. FIG. 4 is a diagram showing the behavior of the imaging apparatus according to Example 1.

Step S1: Judgment of Focusing Demand Operation

When a photographer moves the focal point of the lens 2 for executing a focusing operation, the movement of the focal point is transmitted to the CPU 4 via the focal point position detection unit 5. The CPU 4 judges that the photographer moves the focal point to execute a focusing operation (Yes), and the flow proceeds to Step 2. On the other hand, when the photographer does not execute the focusing operation without moving the focal point, the CPU 4 judges that the focusing operation is not executed (No), and the flow proceeds to Step S1.

Step S2: Display of Enlarged Image

When it is judged that the focusing operation is about to start (Yes) at Step S1, the enlarged image display function of the display-unit image creation unit 11 is turned on to make it easy to execute the focusing operation, and an enlarged image is displayed on the viewfinder 7.

Step S3: Judgment of Stoppage of Focusing Demand

While the focal point continues to be moved, it is judged that the focusing operation is being executed (No), and the enlarged image display is kept in an on-state. Afterward, when the stoppage of the movement of the focal point is detected (Yes), the flow proceeds to Step S4.

Step S4: Detection of Change of Edge Component Amount of Enlarged Display Area

Whether the edge component amount of the image of the enlarged area that is detected by the edge detection unit 13 is increasing or decreasing is judged. It is conceivable that the judgment method is a method in which the judgment is decided by comparing the edge component amount of the current frame with the edge component amount one or several frames ago or a method in which the judgment is decided by executing linear regression using the edge component amounts of several previous frames.

Step S5: Start of Counting Duration Time of Enlarged Display

If the edge component amount of the image of the enlarged area is decreasing when the movement of the focal point is stopped, it is considered that the focal point moved in a direction so as to move away from the focused focal point, and therefore it is expected that the photographer immediately moves the focal point in the opposite direction. In this case, counting the duration time of the enlarged display is started, and the enlarged image display is kept in an on-state for a predefined time without turning the enlarged image display off.

On the other hand, at Step S4, if the edge component amount of the image of the enlarged area is increasing when the movement of the focal point is stopped, it is considered that the focal point is moving in a direction to approach the focused focal point, and therefore it is expected that the focal point will reach the focused focal point or its vicinity, the photographer will finish the focusing operation, and the photographer will go back to the normal photographing after stopping the focusing operation. In this case, the flow proceeds to Step S8, and the enlarged image display is immediately turned off.

Step S6: Redetection of Focusing Demand Operation

After counting the duration time of the enlarged display is started, whether or not the photographer is trying to execute a focusing operation is rejudged. If it is judged that the photographer is trying to execute the focusing operation (Yes), the flow proceeds to Step S3. On the other hand, if it is judged that the photographer is not trying to execute the focusing operation (No), the flow proceeds to Step S7.

Step S7: Judgment of Elapse of Duration Time of Enlarged Display

Whether or not the duration time of the enlarged display exceeds a predefined time is judged. If the duration time of the enlarged display exceeds the predefined time (Yes), the flow proceeds to Step S8, and the enlarged image display is immediately turned off. On the other hand, if the duration time of the enlarged display does not exceed the predefined time (No), the flow proceeds to Step S6.

Step S8: Finish of Enlarged Display

The enlarged image display on the viewfinder 7 is turned off, and the flow proceeds to Step S1.

Figure 5:
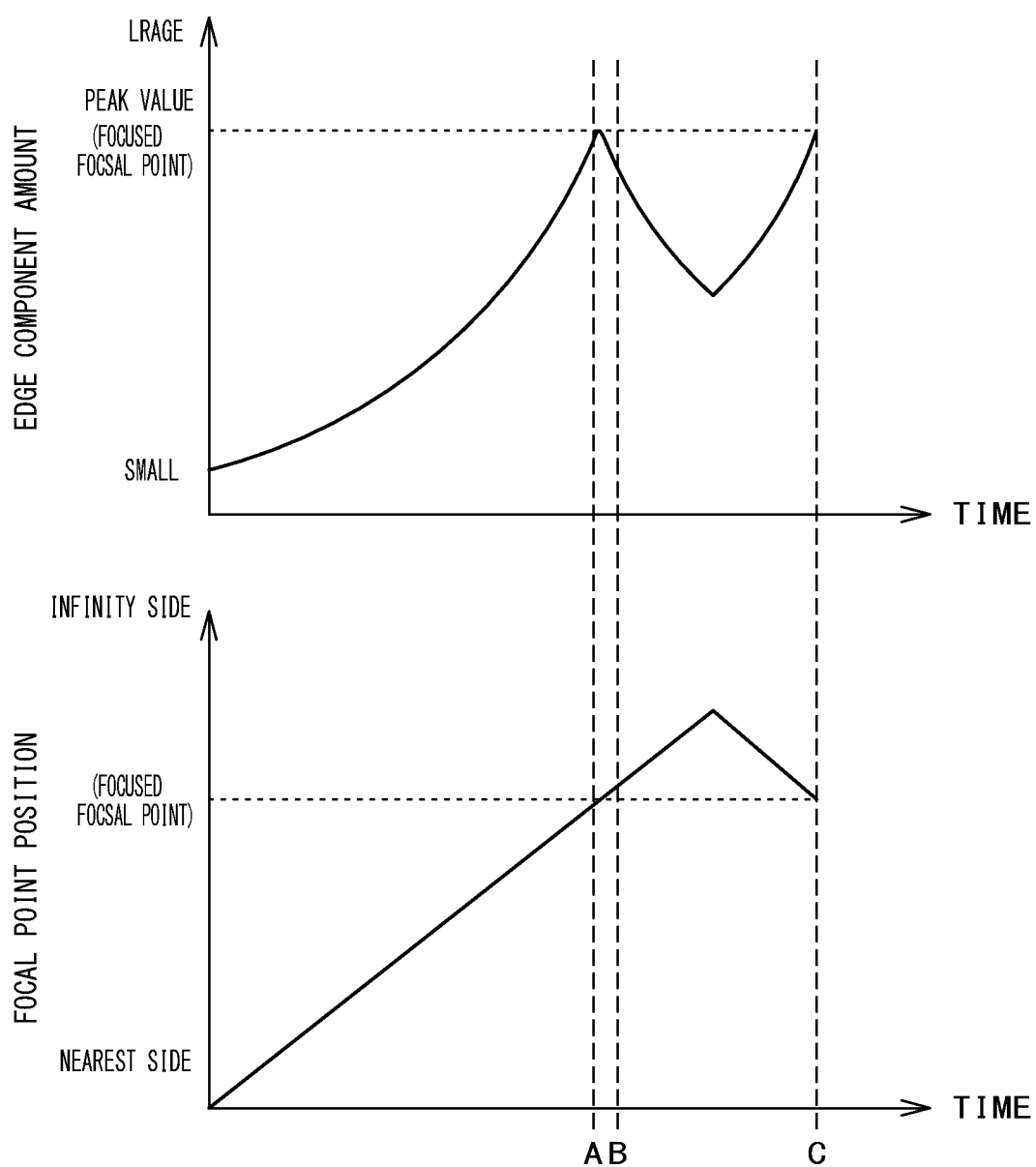
FIG. 5 is a diagram used for explaining the relationship between an edge component amount and a focal point position.

FIG. 5 is a diagram used for explaining the relationship between the edge component amount and a focal point position. In FIG. 5, the times A, B, and C show times at which the focal point is stopped respectively. The edge component amount is increasing at the times A and C, and the edge component amount is decreasing at the time B. On the basis of the judgment at Step S4, at the times A and C at which the edge component amount is increasing, the enlarged image display is immediately turned off (The flow proceeds to Step S8). On the other hand, at the time B at which the edge component amount is decreasing, the enlarged image display is kept in an on-state for a predefined time without being turned off (The flow proceeds to Step S5). In other words, the duration time of the enlarged image display displayed by the image enlargement unit (enlarged image display function) 111 is changed in conjunction with the edge component amount of the image of the enlarged area detected by the edge detection unit 13 and the movement of the focal point detected by the focal point position detection unit 5.

As described above, according to the present invention, the enlarged image display is kept in an on-state during the adjustment of the focal point in which the focal point is moved back and forth with the focused focal point as a center. Afterward, if the focal point is stopped in the vicinity of the focused focal point, that is, if the focusing operation is finished, the enlarged image display is immediately turned off. With this, a comfortable focusing operation can be achieved while an influence on a wide angle image is minimized.

Furthermore, as a side effect, in the case where the enlarged image display is not immediately turned off even if a photographer considers that the focusing operation is completed, it is thinkable that the focal point stops after passing over the focused focal point, so that it is possible to intimate the photographer that the focusing operation has not be completed yet.

<Modification 1>

Figure 6:
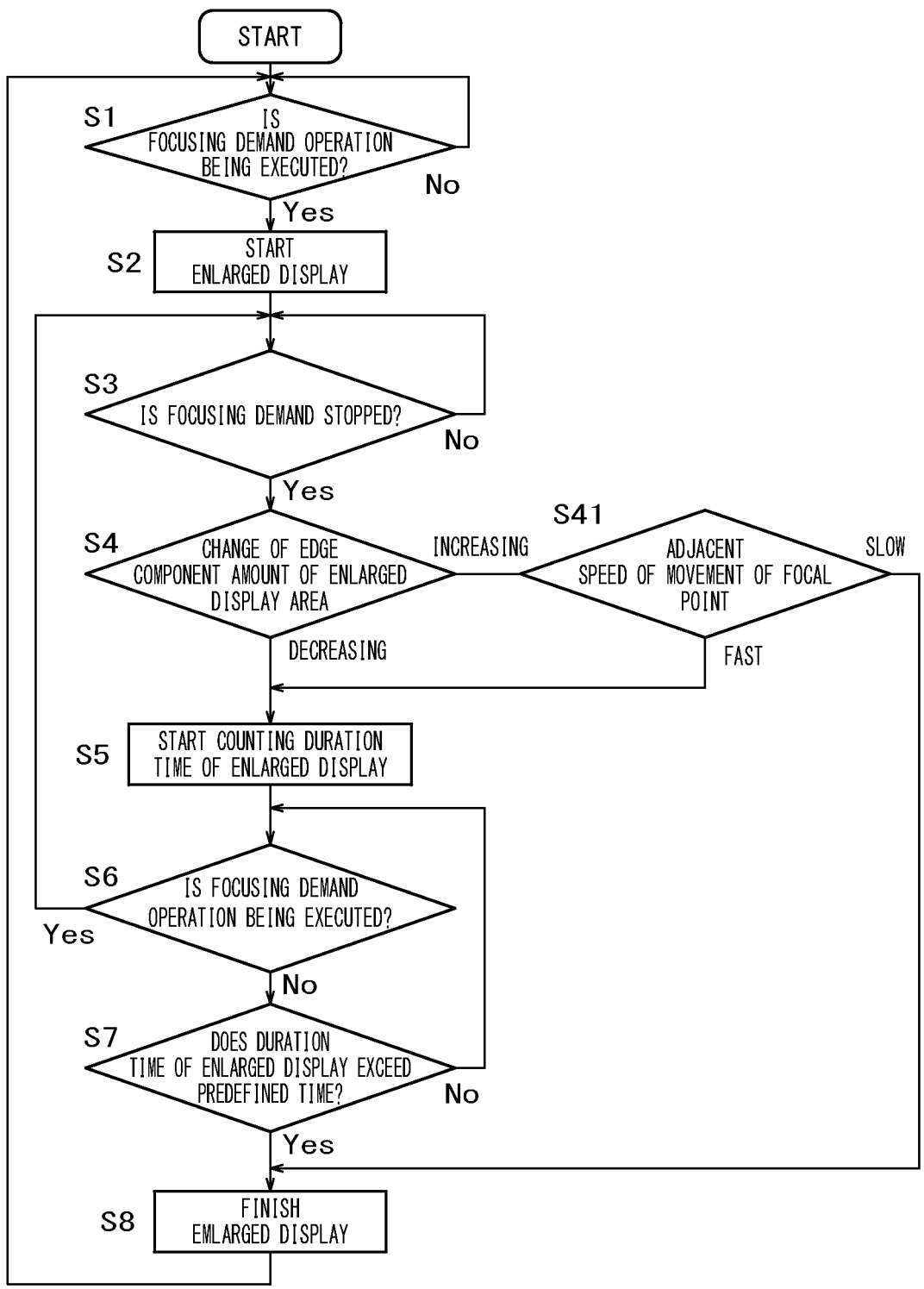
FIG. 6 is a diagram showing the behavior of an imaging apparatus according to Modification 1.

Next, the behavior of an imaging apparatus according to Modification 1 of the present invention will be explained with reference to FIG. 6. FIG. 6 is a diagram showing the behavior of the imaging apparatus according to Modification 1.

A movement of the imaging apparatus that the enlarged image display is turned on when the focal point of the imaging apparatus is moved, and another movement of the imaging apparatus that whether the edge component amount of the image of an enlarged area is increasing or decreasing is judged when the movement of the focal point is stopped are the same as those of the imaging apparatus according to Example 1. In other words, because the movements themselves of Step S1 to Step S8 are the same as those shown in FIG. 4, descriptions thereabout will be omitted.

In this Modification 1, if it is detected that the movement of the focal point is stopped at Step S3, Step S4 and Step S41 are executed. At Step S41, the adjacent speed of the movement of the focal point is calculated. The speed of the movement of the focal point is obtained by dividing the sum of the change amounts of focal point positions of the current frame and the previous one or several frames by the total number of the frames.

If the edge component amount of the image of the enlarged area is increasing at Step S4 and the adjacent the movement of the focal point is fast at Step S41 when the movement of the focal point is stopped, it is expected that the focusing operation is a coarse adjustment and a photographer will move the focal point immediately in the same direction again for executing a fine adjustment, and the enlarged image display is kept in an on-state for a predefined time without being turned off (The flow proceeds to Step S5).

On the other hand, if the edge component amount of the image of the enlarged area is increasing at Step S4, and the adjacent movement of the focal point is slow at Step S41 when the movement of the focal point is stopped, it is expected that the focusing operation is a fine adjustment, the focal point will reach the focused focal point or its vicinity, the photographer will finish the focusing operation, and the photographer will go back to the normal photographing after stopping the focusing operation. Then the enlarged image display is immediately turned off (The flow proceeds to Step S8).

For judging the speed of the movement of the focal point, it is conceivable that a predefined threshold is set, or a threshold can be defined by the photographer. Alternatively, the duration time of the enlarged image display can be changed in accordance with or in conjunction with the speed of the movement of the focal point. For example, it is conceivable that the duration time of the enlarged image display is changed in such a way that, as the speed of the movement of the focal point becomes faster, the duration time of the enlarged image display is set longer, and as the speed of the movement of the focal point becomes slower, the duration time of the enlarged image display is set shorter.

In the case where the edge component amount of the image of the enlarged area is decreasing when the movement of the focal point is stopped, the behavior of the imaging apparatus according to this Modification 1 is the same as that according to Example 1 shown in FIG. 4.

Figure 7:
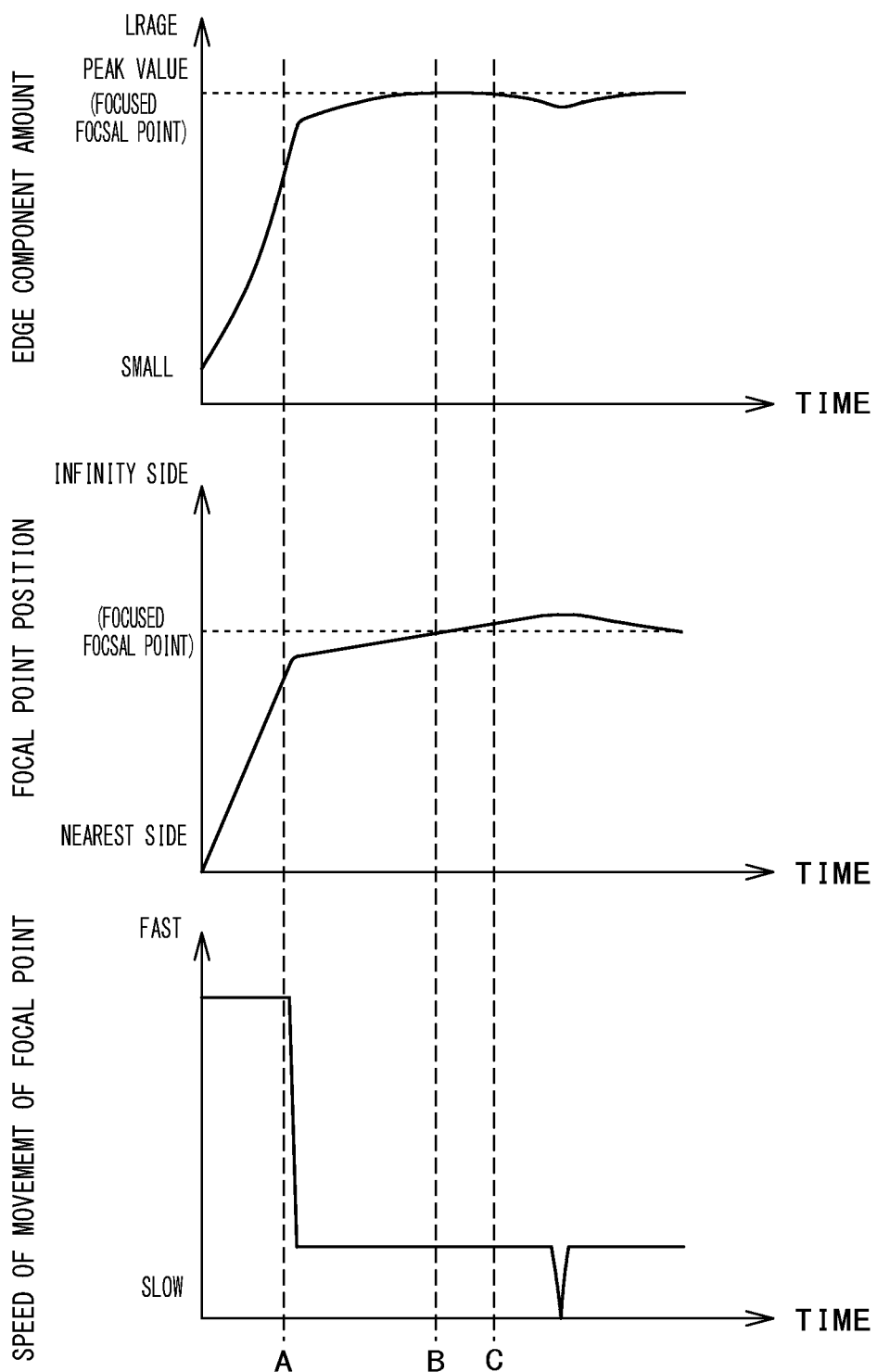
FIG. 7 is a diagram used for explaining the relationships among an edge component amount, a focal point position, and the speed of the movement of a focal point.

FIG. 7 is a diagram used for explaining the relationships among the edge component amount, a focal point position, and the speed of the movement of the focal point. In FIG. 7, the times A, B, and C show times at which the focal point is stopped respectively. At the times A and B, the edge component amount is increasing, and at the time C, the edge component amount is decreasing. The adjacent movement of the focal point is fast at the time A, and the adjacent speed is slow at the times B and C. On the basis of the judgment at Step S41, it is judged that the focal point is being coarsely adjusted at the time A, so that the enlarged image display is kept in an on-state for a predefined time without being turned off (The flow proceeds to Step S5). At the time B, it is judged that the fine adjustment of the focusing operation is finished, and the enlarged image display is immediately turned off (The flow proceeds to Step S8). In addition, it is judged that the focal point is being adjusted at the time C, so that the enlarged image display is kept in an on-state for a predefined time without being turned off (The flow proceeds to Step S5).

As described above, according to Modification 1 of Example 1, the enlarged image display is kept in an on-state during the coarse adjustment of the focal point and the adjustment of the focal point in which the focal point is moved back and forth with the focused focal point as a center. Furthermore, when the movement of the focal point is stopped in the vicinity of the focused focal point through the fine adjustment, the enlarged image display is immediately turned off. With this, a comfortable focusing operation can be achieved while an influence on a wide angle image is minimized.

<Modification 2>

Figure 8:
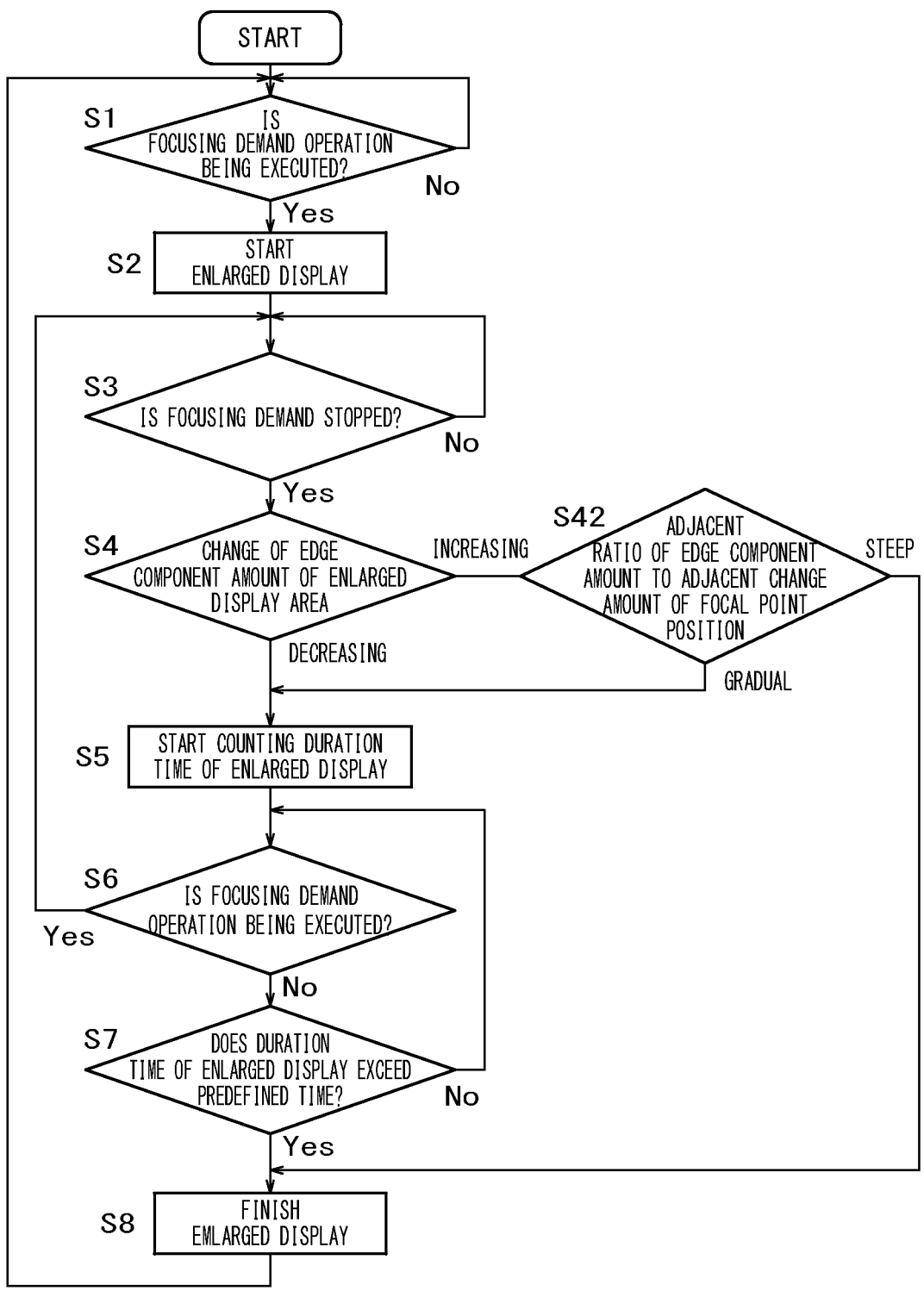
FIG. 8 is a diagram showing the behavior of an imaging apparatus according to Modification 2.

Next, the behavior of an imaging apparatus according to Modification 2 of the present invention will be explained with reference to FIG. 8. FIG. 8 is a diagram showing the behavior of the imaging apparatus according to Modification 2.

A movement of the imaging apparatus that the enlarged image display of the imaging apparatus is turned on when the focal point of the imaging apparatus is moved, and another movement that whether the edge component amount of the image of an enlarged area is increasing or decreasing is judged when the movement of the focal point is stopped are the same as those of the imaging apparatus according to Example 1. In other words, because the movements themselves of Step S1 to Step S8 are the same as those shown in FIG. 4, descriptions thereabout will be omitted.

In this Modification 2, if it is detected at Step S3 that the movement of the focal point is stopped, Step S4 and Step S42 are executed. At Step S42, the adjacent ratio of the change amount of the edge component of the image of the enlarged area to the change amount of a focal point position is calculated.

Generally speaking, the change of the edge component amount to the change of the focal point position changes gradually when the focal point position is far from the focused focal point, and the change of the edge component amount to the change of the focal point position changes more steeply as the focal point position approaches nearer to the focused focal point. However, in the case where a photographic subject is not a planar body but a body having a depth, the focused focal point of the photographic subject has a certain degree of range, so that the change amount of the edge component becomes a bit gradual in a narrow range in the vicinity of the focused focal point.

If the edge component amount of the image of the enlarged area is increasing at Step S4 and the ratio of the change amount of the edge component of the image of the enlarged area to the adjacent change amount of the focal point position is gradual to some extent at Step S42 when the movement of the focal point is stopped, it is expected that the focal point is far from the focused focal point, and the photographer will move the focal point in the same direction again in order to immediately make the focal point approach the focused focal point, so that the enlarged image display is kept in an on-state for a predefined time without being turned off (The flow proceeds to Step S5).

On the other hand, if the edge component amount of the image of the enlarged area is increasing, and the ratio of the change amount of the edge component of the image of the enlarged area to the adjacent change amount of the focal point position is steep to some extent at Step S42 when the movement of the focal point is stopped, it is expected that the focal point will reach the focused focal point or its vicinity, the photographer will finish the focusing operation, and the photographer will go back to the normal photographing after stopping the focusing operation, so the enlarged image display is immediately turned off (The flow proceeds to Step S8).

For judging the ratio of the change of the edge component amount of the enlarged area to the change amount of the focal point position, it is conceivable that a predefined threshold is set, or a threshold can be defined by the photographer. Alternatively, the duration time of the enlarged image display can be changed in accordance with the ratio of the change of the edge component amount. In other words, the duration time of the enlarged image display can be changed in conjunction with or in accordance with the ratio of the change of the edge component amount to the change amount of the focal point position. For example, it is conceivable that the duration time of the enlarged image display is changed in such a way that the duration time of the enlarged image display is set long if the ratio of the change of the edge component amount is gradual, and the duration time of the enlarged image display is set short if the ratio of the change of the edge component amount is steep.

In the case where the edge component amount of the image of the enlarged area is decreasing when the movement of the focal point is stopped, the behavior of the imaging apparatus according to this Modification 2 is the same as that according to Example 1 shown in FIG. 4.

Figure 9:
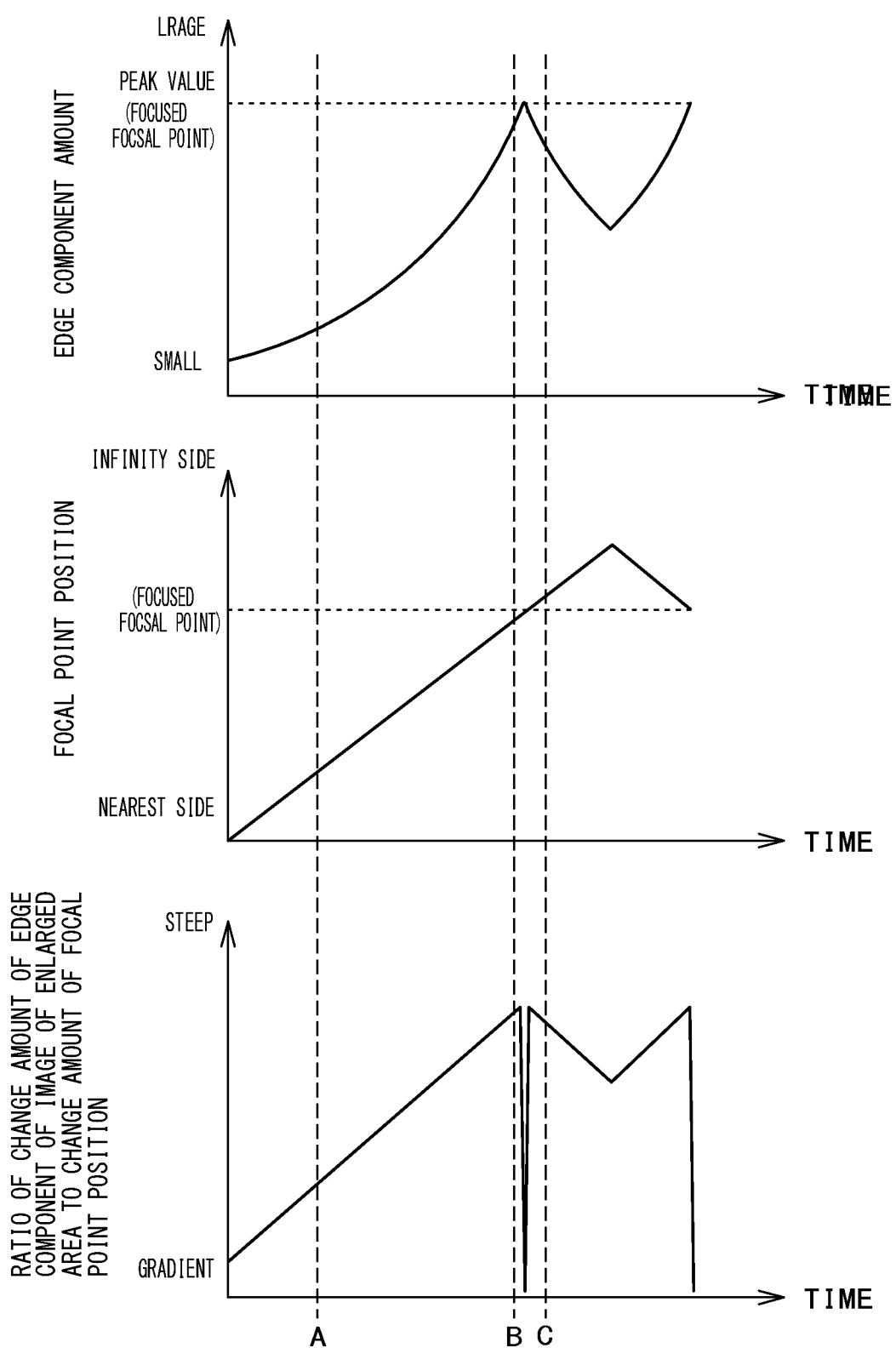
FIG. 9 is a diagram used for explaining the relationships among an edge component amount, a focal point position, and the ratio of the change amount of the edge component of the image of an enlarged area to the change amount of the focal point position.

FIG. 9 is a diagram used for explaining the relationships among the edge component amount, the focal point position, and the ratio of the change amount of the edge component of the image of the enlarged area to the change amount of the focal point position. In FIG. 9, the times A, B, and C show times at which the focal point is stopped respectively. The edge component amount is increasing at the times A and B, and the edge component amount is decreasing at the time C. The ratio of the change amount of the edge component of the image of the enlarged area to the change amount of the focal point position is gradual at the time A and steep at the times B and C. On the basis of the judgment at Step S42, it is judged that the focal point is far from the focused focal point at the time A, and the enlarged image display is kept in an on-state for a predefined time without being turned off (The flow proceeds to Step S5). At the time B, it is judged that the focal point is near to the focused focal point, and the enlarged image display is immediately turned off (The flow proceeds to Step S8). In addition, at the time C, it is judged that the focal point is near to the focused focal point, and the enlarged image display is kept in an on-state for a predefined time without being turned off (The flow proceeds to Step S5).

As described above, according to Modification 2 of Example 1, the enlarged image display is kept in an on-state when the focal point is far from the focused focal point and during the adjustment of the focal point in which the focal point is moved back and forth with the focused focal point as a center. Furthermore, if the focal point is stopped in the vicinity of the focused focal point, that is, if the focusing operation is finished, the enlarged image display is immediately turned off. With this, a comfortable focusing operation can be achieved while an influence on a wide angle image is minimized.

<Modification 3>

Figure 10:
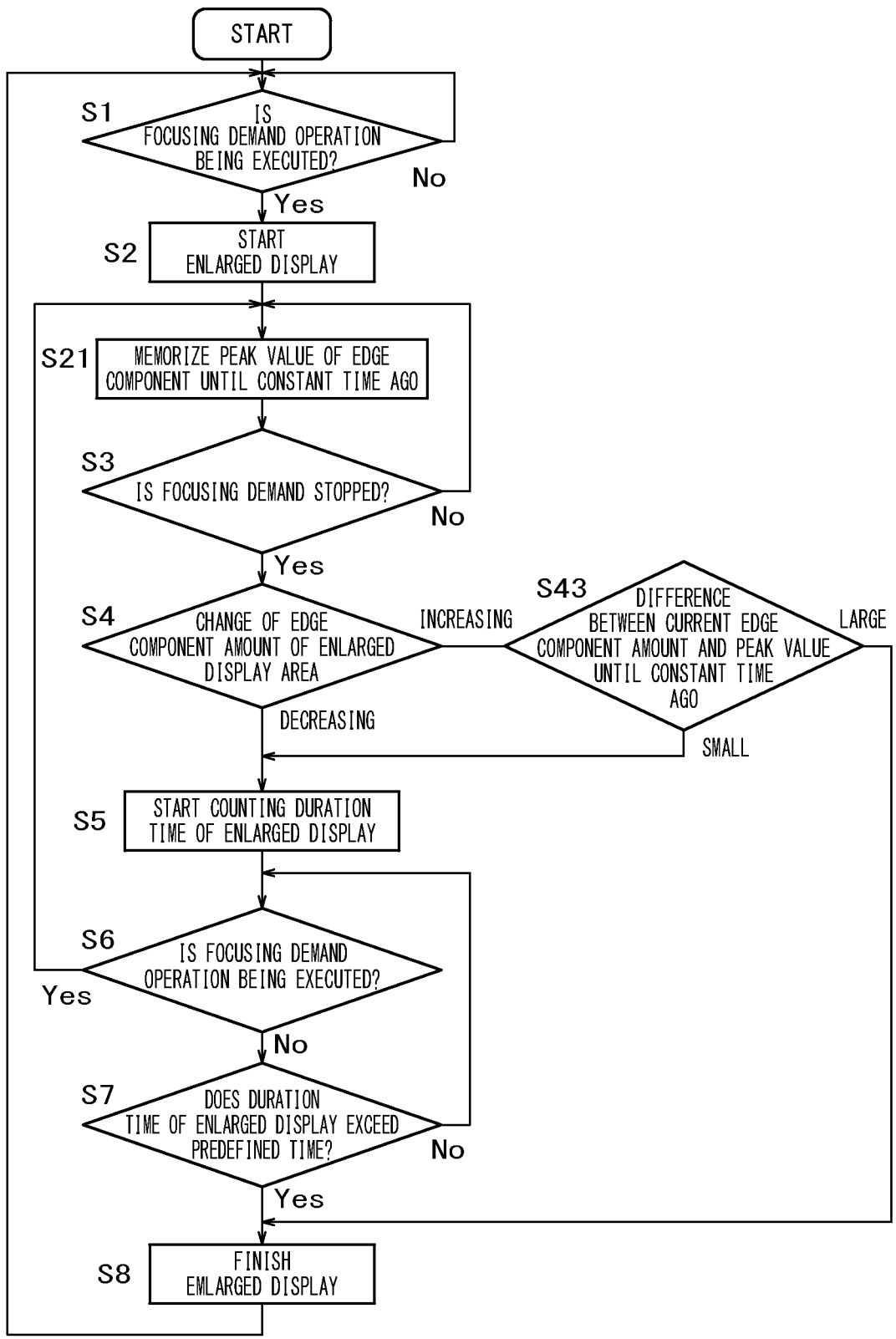
FIG. 10 is a diagram showing the behavior of an imaging apparatus according to Modification 3.

Next, the behavior of an imaging apparatus according to Modification 3 of the present invention will be explained with reference to FIG. 10. FIG. 10 is a diagram showing the behavior of the imaging apparatus according to Modification 3.

The movement of the imaging apparatus that an enlarged image display (the enlarged image display of a photographic subject) is turned on when a focal point (the focal point of the imaging apparatus) is moved, and another movement that a movement for judging whether the edge component amount of the image of an enlarged area is increasing or decreasing when the movement of the focal point is stopped are the same as those of the imaging apparatus according to Example 1. In other words, because the movements themselves described at Step S1 to Step S8 are the same as those shown in FIG. 4, descriptions thereabout will be omitted.

In this Modification 3, Step S21 in which the peak value of the edge component amount of the image of the enlarged area until a constant time ago is memorized is added after Step S2. In addition, if it is detected that the movement of the focal point is stopped at Step S3, Step S4 and Step S43 are executed. At Step S43, a difference between the current edge component amount and the peak value until the constant time ago is calculated. If the focal point passes the focused focal point at least once, it is obvious that a focal point position corresponding to the peak value of the edge component amount is the focused focal point.

If the edge component amount of the image of the enlarged area is increasing at Step S4 and the difference between the current edge component amount and the peak value until the constant time ago is large at Step S43 when the movement of the focal point is stopped, it is expected that the focal point is far from the focused focal point, and the photographer will move the focal point in the same direction again in order to immediately make the focal point approach the focused focal point, so that the enlarged image display is kept in an on-state for a predefined time without being turned off (The flow proceeds to Step S5).

On the other hand, if the edge component amount of the image of the enlarged area is increasing at Step S4 and the difference between the current edge component amount and the peak value until the constant time ago is small at Step S43 when the movement of the focal point is stopped, it is expected that the focal point will reach the focused focal point or its vicinity, the photographer will finish the focusing operation, and the photographer will go back to the normal photographing after stopping the focusing operation, so the enlarged image display is immediately turned off (The flow proceeds to Step S8).

For judging the difference between the edge component amount and the peak value, it is conceivable that a predefined threshold is set, or a threshold can be defined by the photographer. Alternatively, the duration time of the enlarged image display can be changed in accordance with the magnitude of the difference. In other words, the peak value of the edge component amount of the image of the enlarged area until a constant time ago is memorized, and the duration time of the enlarged image display displayed by the image enlargement unit (the enlarged image display function) 111 can be changed in conjunction with the difference between the current edge component amount and the peak value until the constant time ago. For example, it is conceivable that the duration time of the enlarged image display is changed in such a way that, as the difference between the edge component amount and the peak is larger, the duration time of the enlarged image display is set longer, and as the difference between the edge component amount and the peak is smaller, the duration time of the enlarged image display is set shorter.

In the case where the edge component amount of the image of the enlarged area is decreasing when the movement of the focal point is stopped, the behavior of the imaging apparatus is the same as that according to Example 1 shown in FIG. 4.

Figure 11:
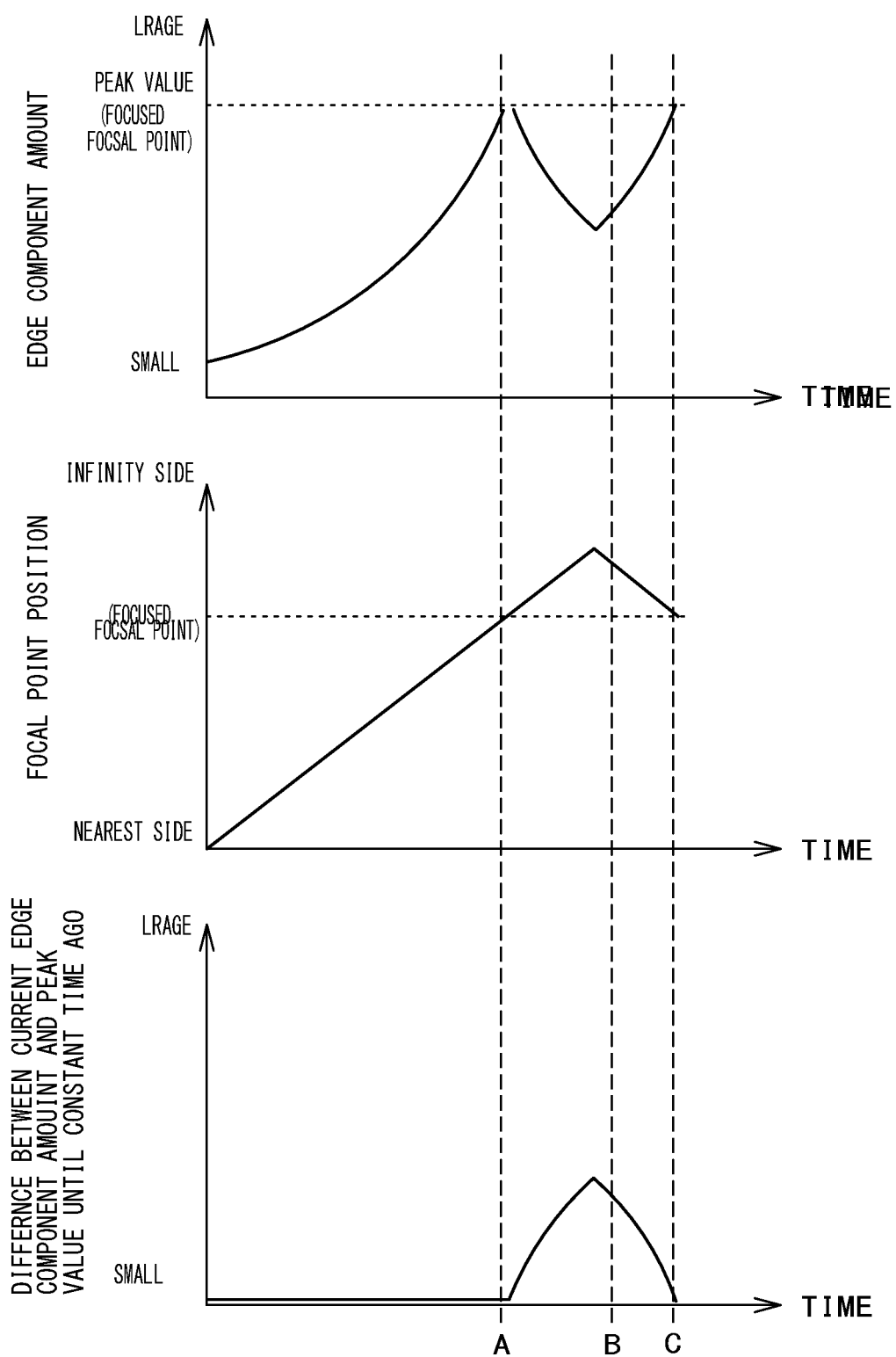
FIG. 11 is a diagram used for explaining the relationships among an edge component amount, a focal point position, and the difference between the current edge component amount and the peak value of the edge component amount until a constant time ago.

FIG. 11 is a diagram used for explaining the relationships among the edge component amount, the focal point position, and the difference between the current edge component amount and the peak value of the edge component amount until a constant time ago. In FIG. 11, the times A, B, and C show times at which the focal point is stopped respectively. At any of the times A, B, and C, the edge component amount is increasing. The difference between the current edge component amount and the peak value of the edge component amount until a constant time ago is small at the times A and C, and large at the time B. On the basis of the judgment at Step S43, it is judged that the focal point is near to the focused focal point at the times A and C, so that the enlarged image display is immediately turned off (The flow proceeds to Step S8). It is judged that the focal point is far from the focused focal point at the time B, so that the enlarged image display is kept in an on-state for a predefined time without being turned off (The flow proceeds to Step S5).

As described above, according to Modification 3 of Example 1, the enlarged image display is kept in an on-state when the focal point is far from the focused focal point and during the adjustment of the focal point in which the focal point is moved back and forth with the focused focal point as a center. In addition, if the focal point is stopped in the vicinity of the focused focal point, that is, if the focusing operation is finished, the enlarged image display is immediately turned off. With this, a comfortable focusing operation can be achieved while an influence on a wide angle image is minimized.

Although this Example 1 and Modifications 1 to 3 have been described in detail so far on the basis of the preferable embodiments thereof, the present invention is not limited to these specified embodiments, but the present invention can be achieved by appropriately combining parts of the above-described embodiments.

In addition, although, in the above-described embodiments, the enlarged image display function is used as an auxiliary function for checking the focused state, the main point of the present invention is to control the on/off operation of the auxiliary function and to suppress an influence on a normal image as much as possible by judging whether a photographer has finished focusing operation or not. Therefore, the present invention can be applied to the on/off control of other auxiliary functions that exercise influences on normal images (such as a function that colors only a portion the edge component of the image of which is large and decolors other portions, and a function that displays focused states by a histogram).

EXAMPLE 2

Figure 12:
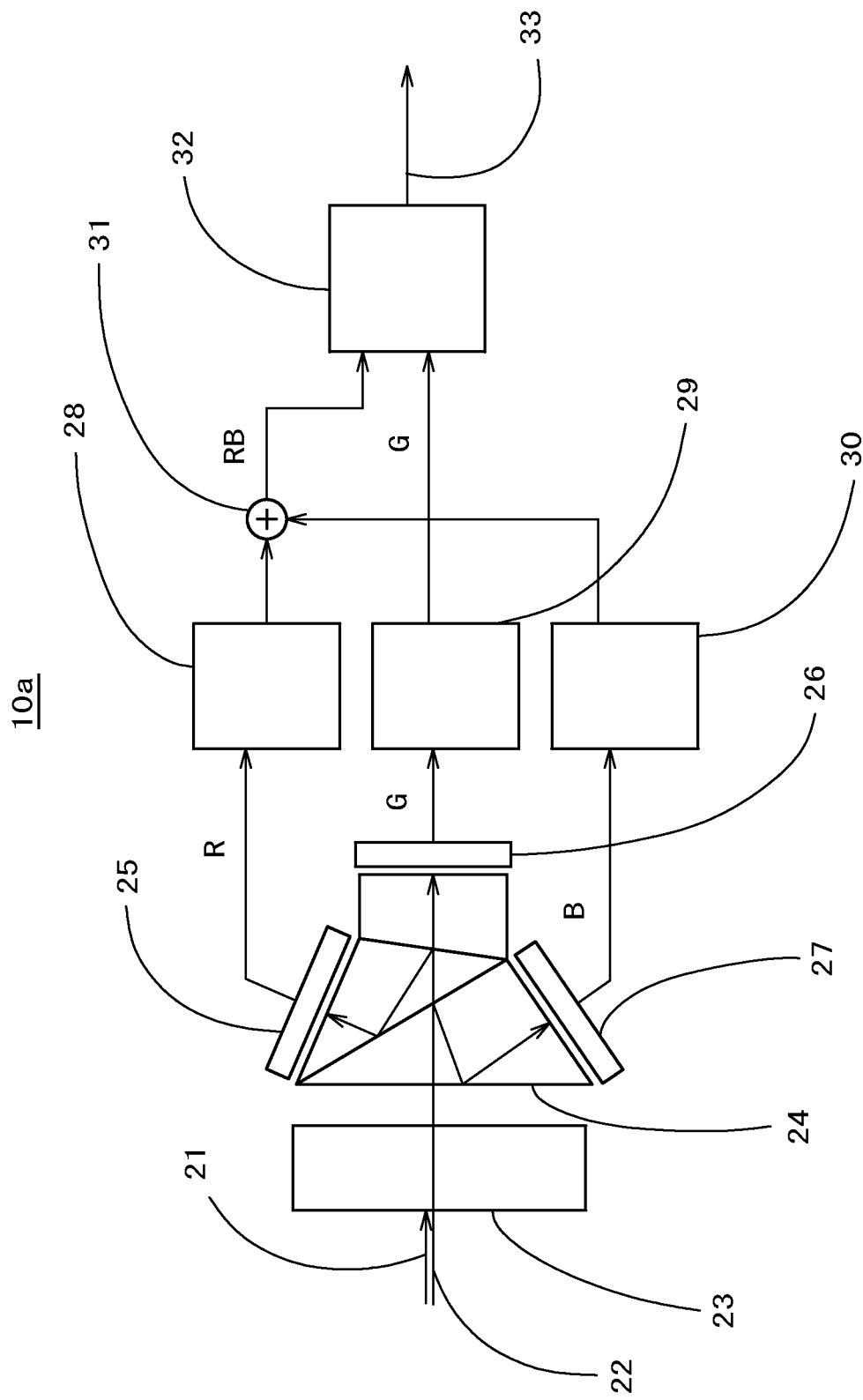
FIG. 12 is a block diagram showing a configuration example of an imaging apparatus according to Example 2.
Figure 13:
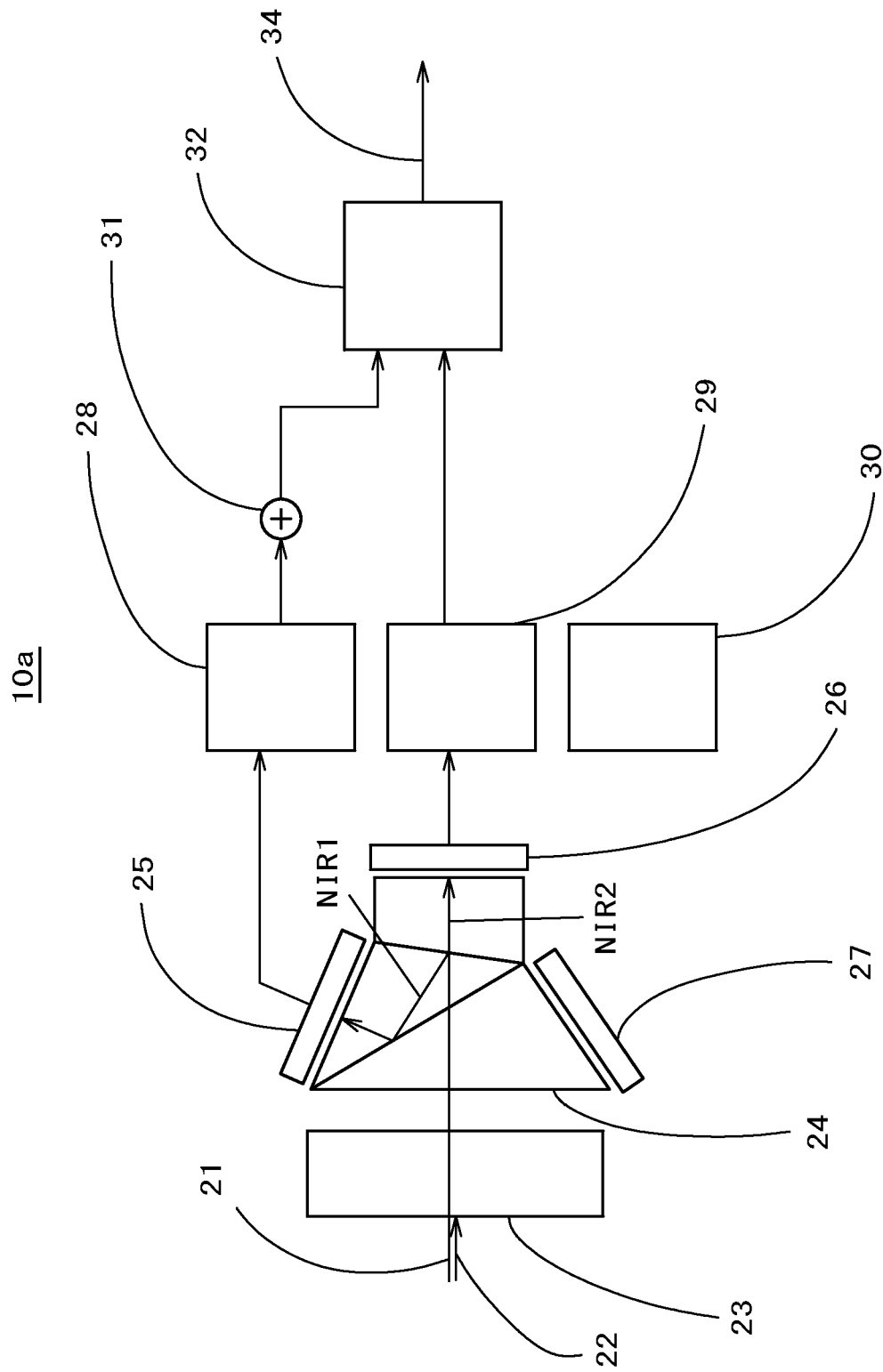
FIG. 13 is a block diagram showing a configuration example of the imaging apparatus according to Example 2.

FIG. 12 and FIG. 13 are block diagrams showing a configuration example of an imaging apparatus according to Example 2.

In FIG. 12 and FIG. 13, the fundamental configuration of an imaging apparatus 10a is the configuration of a three-plate pixel shift camera. The imaging apparatus selects a visible light 22 or a near-infrared light 21 out of the visible light 22 and the near-infrared light 21 that enter the imaging apparatus itself using an optical selection filter 23. The optical selection filter 23 is configured to be capable of transmitting the visible light 22 or the near-infrared light 21. If the optical selection filter 23 is set so as to transmit the visible light 22, the visible light 22 is resolved into a red signal R, a green signal G, and a blue signal B by a wavelength resolution prism 24 on the basis of the wavelengths of these signals, and these signals are input into the installed sensors 25, 26, and 27 respectively. Sensors 25, 26, and 27 are fixed with their positions relatively shifted from one another. In the case where the blue and the red are shifted relative to the green, the sensor 25, the sensor 26, and the sensor 27 are fixed with their positions a half-pixel shifted from one another, and in the case where the red, the green, and the blue are shifted from one another, these sensors are fixed with their positions shifted a one third-pixel from one another. The configurations of FIG. 12 and FIG. 13 are the configurations with a half-pixel shift. The signal G, blue signal B, and red signal R outputted from the sensors 25, 26, and 27 respectively are adjusted so as to have desired signal levels by signal level adjustment devices 28, 29, and 30 respectively. Afterward, the red signal R and the blue signal B are added by an adder 31. The blue signal G and a red-blue mixed signal RB are mixed by an interpolation/synthesis device 32, so that an image signal 33 having double signal information is outputted. Here, if the above-mentioned shift is executed both in the horizontal direction and the vertical direction, the effect of the abovementioned shifts can be obtained in both horizontal direction and vertical direction.

On the other hand, as shown in FIG. 13, if the optical selection filter 23 is set so as to transmit the near-infrared light 21, the near-infrared light 21 is divided into equal two to create a first near-infrared signal NIR1 and a second near-infrared light NIR2, and the first near-infrared signal NIR1 and the second near-infrared light NIR2 are sent to the sensor 25 and the sensor 26 respectively. As illustrated in FIG. 12, because these sensors 25 and 26 are fixed with their positions a half-pixel shifted from each other, signal processing similar to the signal processing illustrated in FIG. 12 is executed, so that it becomes possible that an image signal 34 with an improved resolution can be outputted. Because the improvement of resolution for the two kinds of optical signals (21, 22) can be realized by the abovementioned configuration that is almost the same as the configuration of an existing camera, the improvement of resolution, which is conventionally realized by two image apparatuses, can be realized by one imaging apparatus. Because the configuration of the abovementioned imaging apparatus is not so much different from that of a conventional imaging apparatus, an expenditure for realizing the configuration of the abovementioned imaging apparatus is almost the same as that for realizing the configuration of the conventional imaging apparatus.

The wavelength resolution prism 24 that resolves the visible light 22 and the near-infrared light 21 will be explained with reference to FIG. 14. FIG. 14 is a diagram used for explaining the prism that resolves the visible light and the near-infrared light.

Because the wavelength resolution prism (color resolution prism) 24 is an optical filter, the wavelength resolution prism 24 is configured to select a specified wavelength by combining various filters. In other words, although a combination of bandpass filters is used, each of the bandpass filters has a characteristic that it has a certain passband other than its specified passband, and therefore wavelength bands that pass through regions other than the specified wavelength are prevented from occurring by combining lowpass filters and high pass filters. In FIG. 14, a reference sign 35 shows the blue signal, a reference sign 36 shows the green signal, a reference sign 37 shows the red signal, and a reference sign 38 shows the near-infrared signal.

A conventional optical prism is designed so as to prevent the transmission of wavelengths other than specified wavelength, especially channel mixing that causes the degradation of color reproducibility from occurring as mentioned above. In this Example 2, optical signals are made to reach the two sensors (25, 26) respectively by intentionally mixing signals at a specified wavelength, for example, at a specified wavelength of the near-infrared light 21.

As a result, when the visible light 22 is transmitted, the imaging apparatus according to this Example 2 functions as a pixel shift camera, and when the near-infrared light 21 is transmitted, the imaging apparatus having the same configuration can bring about a pixel shift effect on the signal of the near-infrared light 21. In an example shown in FIG. 14, a resolution improvement effect on the near-infrared light 21 having wavelengths of 750 nm to 850 nm can be obtained. The wavelength resolution prism 24 having this effect can be realized only by removing correction filters for a red signal R and a green signal G in the infrared signal region.

According to this Example 2, in the case where the illumination of the visible light 22 is used, the effect of a pixel shift camera can be obtained by the imaging apparatus, and even in the case where the illumination of the near-infrared light 21 is used, the effect of the improvement of resolution brought about by the effect of pixel shift can be obtained by the imaging apparatus having the same configuration. Because materials used in this imaging apparatus are not different from those used in a conventional imaging apparatus, a cost for realizing this imaging apparatus is not increased. Rather, because the correction filters of the wavelength resolution prism 24 are removed, the cost of the materials used in this imaging apparatus can be reduced.

Furthermore, the configuration of the imaging apparatus 10a according to Example 2 shown in FIG. 12 and FIG. 13 can also be applied to the imaging apparatus 10 according to Example 1 shown in FIG. 1. In this case, the behaviors of Example 1 and Modifications 1 to 3 shown in FIG. 4 to FIG. 11 can be applied to the imaging apparatus 10a having the configuration shown in FIGS. 12 and 13.

In the above descriptions, although the invention achieved by the inventers has been explained concretely on the basis of the examples and the modifications, the present invention is not limited to the above-described examples and modifications, and it goes without saying that various kinds of alternations can be made to the above-described examples and modifications.

The present application claims priority on the basis of Japanese Patent Application JP 2018-165211, filed on Sep. 4, 2018, the entire contents of which are hereby incorporated by reference into this application.

REFERENCE SIGNS LIST

1 . . . Image Signal Processing Unit
2 . . . Lens
3 . . . Imaging Element
4 . . . CPU
5 . . . Focal Point Position Detection Unit
6 . . . Memory
7 . . . Viewfinder
8 . . . Image Signal Output Unit
10 . . . Imaging Apparatus
11 . . . Display-Unit Image Creation Unit
12 . . . Gamma Correction Unit
13 . . . Edge Detection Unit
111 . . . Image Enlargement Unit
112 . . . Edge Extraction Unit
21 . . . Near-Infrared Light
22 . . . Visible Light
23 . . . Optical Selection Filter
24 . . . Wavelength Resolution Prism
25, 26, 27 . . . Sensor
28, 29, 30 . . . Signal Level Adjustment Device
31 . . . Adder
32 . . . Interpolation/Synthesis Device
NIRT1 . . . First Near-Infrared Light Signal
NIRT2 . . . Second Near-Infrared Light Signal

The invention claimed is:

1. An imaging apparatus comprising:
a display unit for displaying an image being photographed;
an enlarged image display function for displaying an image obtained by enlarging a part of an area being photographed in the display unit;
an edge component detection function for detecting an edge component amount of an enlarged image area; and
a focal point position detection function for detecting movement of a focal point operated by a photographer,
wherein duration time of the enlarged image display displayed by the enlarged image display function is changed in conjunction with the edge component detected by the edge component detection function and the movement of the focal point detected by the focal point position detection function, and
wherein the duration time of the enlarged image display displayed by the enlarged image display function is changed in conjunction with a speed of the movement of the focal point.

2. The imaging apparatus according to claim 1, wherein the duration time of the enlarged image display displayed by the enlarged image display function is changed in conjunction with a ratio of a change amount of the edge component of the image of the enlarged area to a change amount of a position of the focal point.

3. The imaging apparatus according to claim 1, wherein a peak value of the edge component amount of the image of the enlarged area until a constant time ago is memorized, and the duration time of the enlarged image display displayed by the enlarged image display function is changed in conjunction with a difference between a current edge component amount and the peak value until the constant time ago.

* * * * *